US010689103B2

(12) United States Patent
Holik (10) Patent No.: US 10,689,103 B2
(45) Date of Patent: Jun. 23, 2020

(54) QUICK RELEASE FOLDING PROPELLER BLADES FOR A MODEL AIRCRAFT

(71) Applicant: Landing Products, Inc., Woodland, CA (US)

(72) Inventor: Robert Holik, Woodland, CA (US)

(73) Assignee: Landing Products, Inc., Woodland, CA (US)

( * ) Notice: Subject to any disclaimer, the term of this patent is extended or adjusted under 35 U.S.C. 154(b) by 95 days.

(21) Appl. No.: 15/986,166

(22) Filed: May 22, 2018

(65) Prior Publication Data

US 2019/0359317 A1 Nov. 28, 2019

(51) Int. Cl.
*B64C 27/48* (2006.01)
*B64C 11/28* (2006.01)
*B64C 11/04* (2006.01)
*A63H 27/00* (2006.01)

(52) U.S. Cl.
CPC ............. *B64C 27/48* (2013.01); *A63H 27/02* (2013.01); *B64C 11/04* (2013.01); *B64C 11/28* (2013.01); *B64C 2201/042* (2013.01); *B64C 2201/108* (2013.01); *B64C 2203/00* (2013.01)

(58) Field of Classification Search
CPC .......... B64C 3/56; B64C 11/28; B64C 11/04; B64C 27/022; B64C 27/48; B64C 27/50; B64C 2201/102; B64C 2201/042; B64C 2201/108; A63H 27/00; A63H 27/007; A63H 27/12; Y10T 403/32319; Y10T 403/32336; Y10T 403/32352; Y10T 403/32361; Y10T 403/32377; Y10T 403/32581; Y10T 403/7073

USPC .................................................. 416/142, 143
See application file for complete search history.

(56) References Cited

U.S. PATENT DOCUMENTS

| | | | | |
|---|---|---|---|---|
| 2,264,568 A | * | 12/1941 | Hamilton | B64C 11/34 416/89 |
| 2,689,617 A | | 9/1954 | Bouley | |
| 4,879,781 A | * | 11/1989 | Desimone | A46B 15/0055 15/110 |
| 5,324,223 A | | 6/1994 | Yang | |
| 5,628,620 A | * | 5/1997 | Arlton | A63H 27/12 416/103 |
| 7,946,523 B2 | | 5/2011 | Zimet | |
| 7,946,526 B2 | * | 5/2011 | Zimet | B64C 27/10 244/17.19 |
| 8,089,034 B2 | * | 1/2012 | Hammerquist | B64C 3/56 244/3.27 |
| 8,133,089 B2 | | 3/2012 | Amireh et al. | |
| 8,430,709 B1 | | 4/2013 | Wong | |
| 9,079,115 B2 | | 7/2015 | Huang et al. | |

(Continued)

OTHER PUBLICATIONS

Dji.com, "Inspire 1—1345T Quick Propellers", downloaded from Internet Jun. 2017.

*Primary Examiner* — Kenneth J Hansen
*Assistant Examiner* — Maranatha Boardman
(74) *Attorney, Agent, or Firm* — Vierra Magen Marcus LLP (57) ABSTRACT

A quick release propeller for model airplanes is disclosed including two or more blades mounted to a hub. For each blade, the hub includes a slot and a shoulder. Each blade includes a base portion having pins which slide into the slot in the hub. The slots are curved which prevents the blades from being removed unless they are rotated at predefined threshold angle with respect to the hub.

26 Claims, 6 Drawing Sheets

(56) References Cited

U.S. PATENT DOCUMENTS

| | | | |
|---|---|---|---|
| 9,434,471 B2* | 9/2016 | Arlton | B64C 27/14 |
| 10,155,585 B2* | 12/2018 | Johannesson | B64C 27/50 |
| 2011/0253831 A1 | 10/2011 | Cheng | |
| 2016/0001879 A1* | 1/2016 | Johannesson | B64C 27/50 |
| | | | 416/142 |
| 2017/0283050 A1* | 10/2017 | Baek | B64C 27/08 |
| 2018/0037311 A1* | 2/2018 | Tian | B64C 11/08 |
| 2018/0257769 A1* | 9/2018 | Goldstein | B64C 27/50 |

\* cited by examiner

QUICK RELEASE FOLDING PROPELLER BLADES FOR A MODEL AIRCRAFT

FIELD

The present invention relates to a propeller for a model aircraft, and in particular, to a propeller which may be quickly and easily removed when not rotating under power of the model aircraft engine.

BACKGROUND

Model aircraft including remotely controlled planes and helicopters include a propeller for providing thrust or lift and an engine for providing torque to the propeller. It may be desirable to remove and replace a propeller, such as for example where a propeller gets damaged during flight. However, given the need to ensure that the blades of a propeller remain secured and operational during flight, conventional propellers generally require tools for the removal, or at the very least complicated manual operations.

DETAILED DESCRIPTION

The present technology will now be described with reference to the figures, which in embodiments, relate to a quick release propeller for model airplanes including one or more blades mounted to a hub. For each blade, the hub includes a slot and a shoulder. Each blade includes a square base portion including pins which slide into the slot in the hub.

The slots are curved which prevents the blades from being removed unless they are rotated at an angle with respect to the hub. In particular, when the blade is oriented straight out from the hub (as would occur due to centrifugal forces on the blades during propeller rotation) the square base portion of the blade abuts against the shoulder to prevent the blade from being separated from the hub when the blade is oriented straight out from the hub. When the blade is rotating, centrifugal forces will also hold the blades in the slot to further prevent the blades from separating from the hub.

However, when propeller is not rotating, the blades may be manually rotated relative to the hub. Upon rotating a blade relative to the hub, the square base portion of the blade clears the hub shoulder and allows the blade to be easily removed.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25% of a given dimension.

Figure 1:
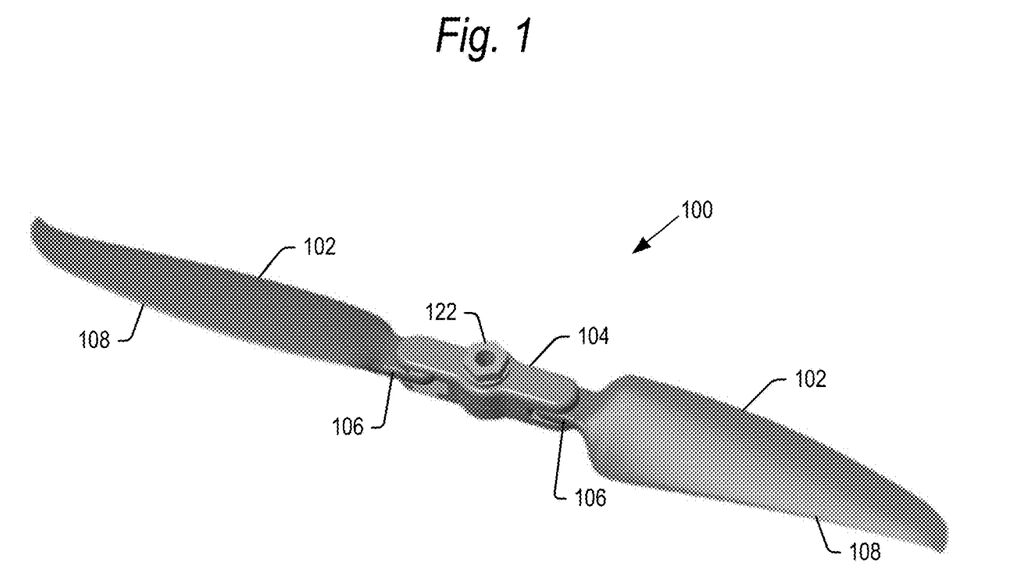
FIG. 1 is a perspective view of a propeller according to embodiments of the present technology.
Figure 2:
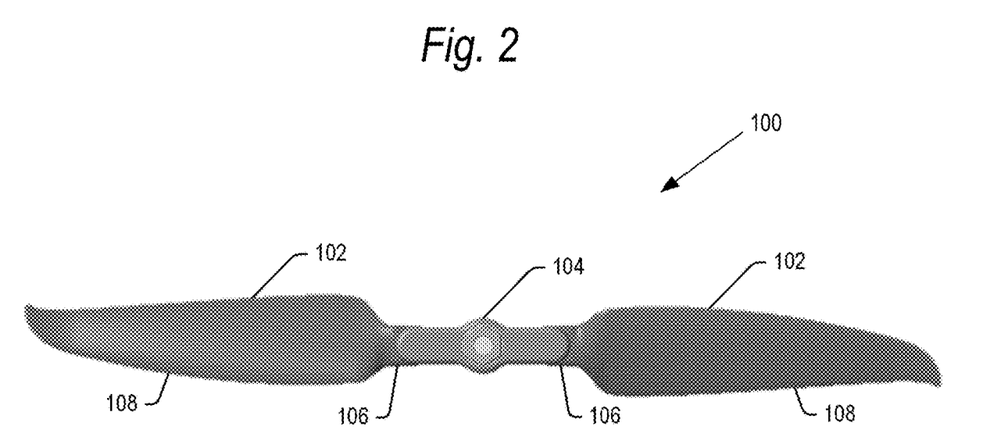
FIG. 2 is a top view of a propeller according to embodiments of the present technology.
Figure 3:
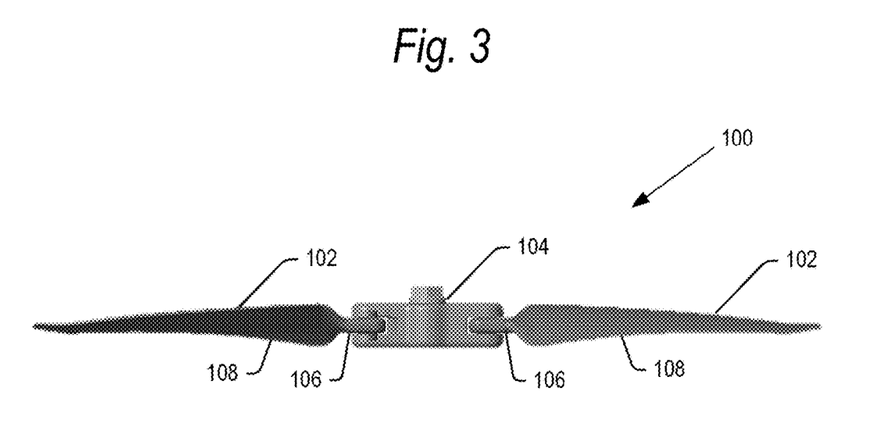
FIG. 3 is an edge view of a propeller according to embodiments of the present technology.

An embodiment of the present technology will now be explained with reference to the views of FIGS. 1-14. FIGS. 1, 2 and 3 are perspective, top and edge views, respectively, of a propeller 100 according to embodiments of the present technology. Propeller 100 comprises blades 102 removably affixed to a hub 104 as explained below. While the figures show a pair of blades affixed to hub 104, there may be more than two blades in further embodiments of the present technology (including 3, 4 or more blades), or a single blade with a counterweight on the opposed side of the hub. The hub 104 shown is configured to receive a pair of blades but would be altered as will be explained below for embodiments including more than two blades.

Each blade 102 includes a connector end 106 and a body 108 extending from the connector end 106. The body 108 of each blade 102 is configured to provide forward thrust to a model aircraft (not shown) to which the propeller 100 is affixed when the propeller 100 is rotated by a motor (not shown) within the aircraft. It is understood that the body 108 of each blade 102 may have a wide variety of different sizes and configurations for providing forward thrust when the aircraft is an airplane. In further embodiments, the aircraft may be a helicopter or a multi-copter, in which case the body 108 of each blade 102 may have a wide variety of different sizes and configurations for providing lift when the blades are rotated by a motor within the helicopter or multi-copter. The blades 102 may be formed of molded plastic, metal or a composite material. The connector end 106 of each blade 102 is removably affixed to the hub 104 as will now be described with reference to FIGS. 4-13.

Figure 4:
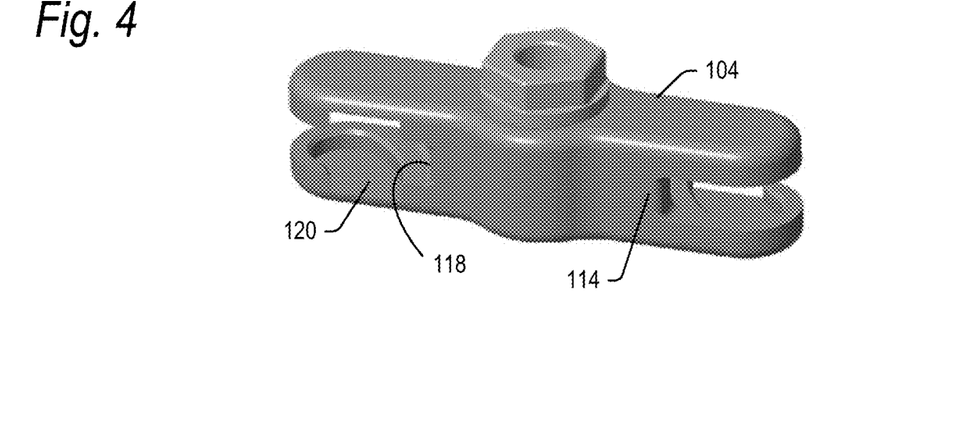
FIG. 4 is a perspective view of a hub for a propeller according to embodiments of the present technology.
Figure 5:
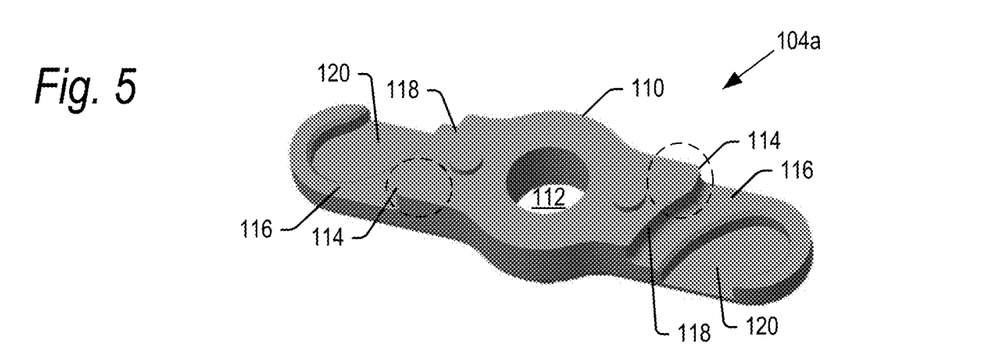
FIG. 5 is a perspective view of a first half of the hub for a propeller according to embodiments of the present technology.
Figure 6:
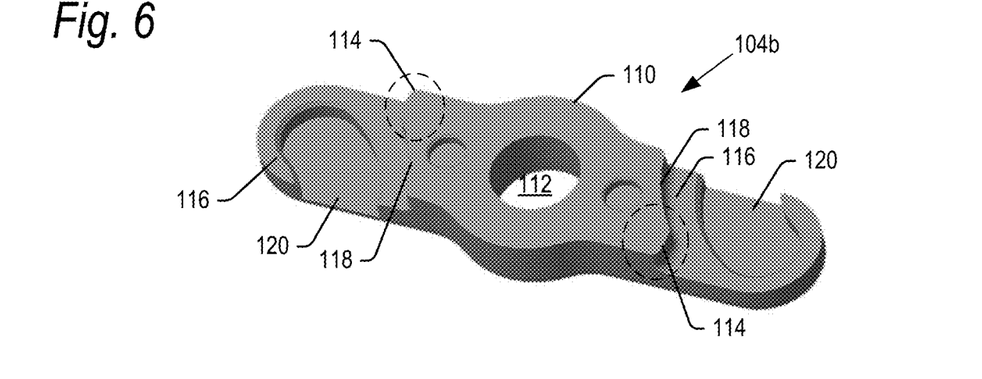
FIG. 6 is a perspective view of a second half of the hub for a propeller according to embodiments of the present technology.

FIG. 4 is a perspective view of a hub 104. While shown in FIG. 4 in an assembled or unitary construction, the hub 104 may be formed of two separate halves which may be snap-fit together or otherwise affixed to each other. FIG. 5 shows a first half 104a of hub 104 (the top half shown in FIG. 4), and FIG. 6 shows a second half 104b of hub 104 (the bottom half shown in FIG. 4). The hub 104 be formed of a single, unitary construction in further embodiments. Whether formed of two halves or of a single unitary construction, the hub 104 may be formed of molded plastic, metal such as aluminum or a composite material.

Each half 104a, 104b of hub 104 has different sections cut at different elevations with respect to a thickness of each half 104a, 104b of hub 104. A center region 110 of each half 104a, 104b includes an axis of rotation of the hub. The center region 110 of each half 104a, 104b is a full thickness of each half, which in one example may be 0.235 inches. It is understood that the thickness of the respective halves may be greater or lesser than that in further embodiments. The center region of each half may include a circular hole 112 and a pair of shoulders 114. The circular holes 112 align with each other when the halves 104a and 104b are affixed to each other, and is provided for receiving the motor drive shaft (not shown). The motor drive shaft may have a threaded end so that a nut 122 (FIG. 1) can affix the hub 104 to the draft shaft so as to rotate with the drive shaft. The hub to motor attachment can take any of several forms, including for example a center shaft with flat spots, bolts offset from center that attach the hub to the motor, etc.

The shoulders 114 are provided to maintain the blades 102 affixed to the hub 104, and to prevent blades from inadvertently sliding out of the hub, when the blades 102 are in an axially extended position relative to the hub 104 as explained below. When the halves 104a, 104b are assembled together, each of the shoulders 114 in the respective halves align with each other. When formed of a single, unitary construction, the shoulders 114 may be formed within sections of the hub 104 as shown in FIG. 4.

Each half 104a, 104b of hub 104 further includes a pair of recessed sections 116 radially out from the center region 110. Recessed sections 116 are recessed, for example to a thickness of 0.142 inches, though the thickness of the recessed sections 116 may be greater or lesser than that in further embodiments. The recessed sections 116 are formed in the respective halves 104a, 104b so as to define a shape at the outer edges of the center region 110 (i.e., at the boundaries between the center region 110 and the pair of recessed sections 116) which shape defines the shoulders 114 described above, and curved wall sections 118. As explained below, the curved wall sections 118 allow rotation of the blades 102 relative to the hub 104. When the halves 104a, 104b are assembled together, each of the curved wall sections in the respective halves align with each other.

Each recessed section 116 of each half 104a, 104b of hub 104 may further include curved slots 120 recessed into the respective recessed sections 116. When the halves 104a, 104b are assembled together, each of the curved slots 120 in the respective halves align with each other. When formed of a single, unitary construction, the slots 120 may be formed recessed within sections of the hub 104 as shown in FIG. 4. In one embodiment, each slot 120 may have a radius of curvature of 0.455 inches and opposed sidewalls that are spaced from each other 0.255 inches. However, this radius of curvature and spacing between opposed sidewalls are provided by way of example only and may vary in further embodiments. At least the spacing between sidewalls may be partially based on the diameter of pins on the ends 106 of blades 102, so that the pins fit snugly within the slots 110 as explained below.

Figure 7:
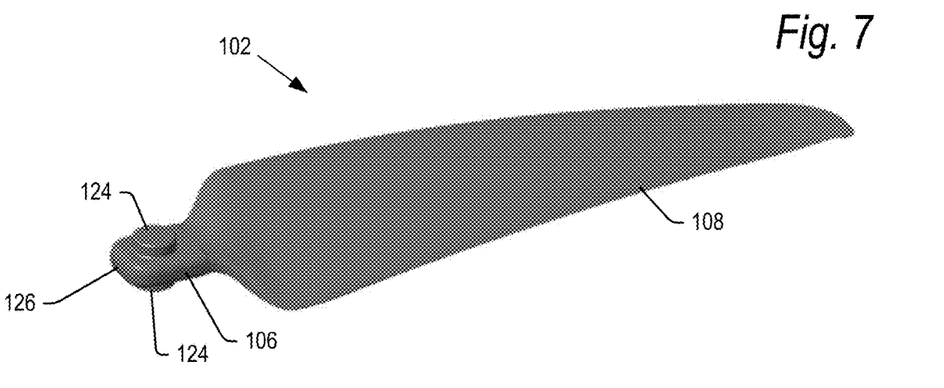
FIG. 7 is a perspective view of a blade of a propeller according to embodiments of the present technology.

FIG. 7 shows one of the blades 102 including connector end 106 and body 108. As shown, the connector end 106 includes a pair of protruding pins 124 extending from the first and second major surfaces of the connector end 106. The pins 124 extending from the first and second major surfaces may be axially aligned with each other. With the hub 104 fully assembled into a single unitary piece, the pins 124 from a single blade 102 fit snugly within the pair of aligned, curved slots 120 in the respective halves 104a, 104b of hub 104. The connector end 106 also includes an edge 126 defining the very end of blade 102.

Figure 8:
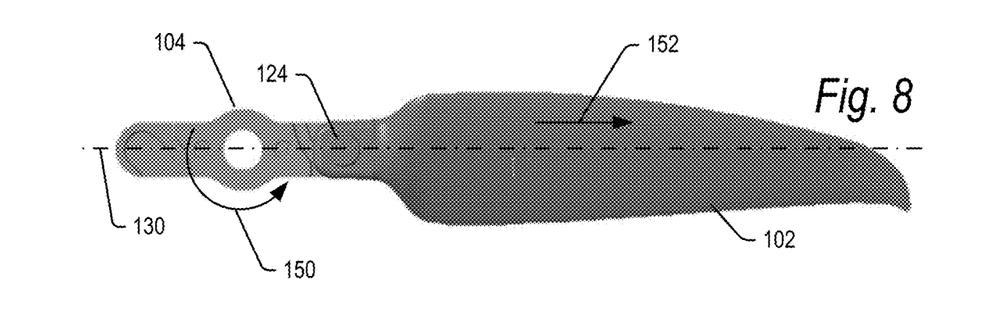
FIG. 8 is a top view of a blade affixed to a hub and extending straight out from the hub according to embodiments of the present technology.
Figure 9:
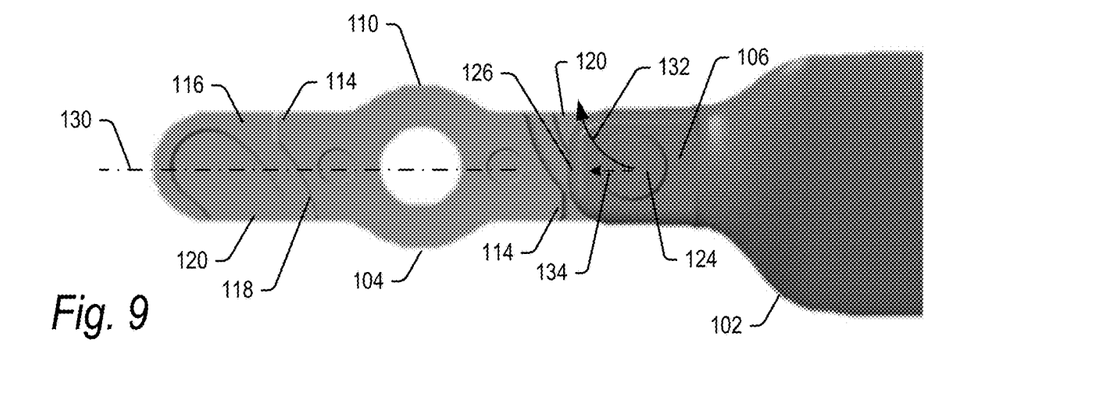
FIG. 9 is an enlarged top view of the hub and a portion of the blade shown in FIG. 8.

FIG. 8 is a view of the blade 102 affixed to the hub 104, and FIG. 9 is an enlarged view of the hub and a portion of the blade shown in FIG. 8 (one half 104a of the hub 104 is removed in FIGS. 8 and 9 for clarity). In the embodiment of FIGS. 8 and 9, the hub is configured for right hand propeller rotation (in the direction of arrow 150). When the propeller is rotating, centrifugal forces would act on the propeller blades 102 in the direction of arrow 152. Thus, when rotating, the blades would extend straight out from the hub 104 as shown in FIGS. 8 and 9. That is, the hub has a longitudinal axis 130. Centrifugal forces would bias the blades 102 into positions along the same axis (i.e., there is no angle between the longitudinal axis of the hub and the longitudinal axis of the blade when the blade 102 center of mass is appropriately located).

In accordance with aspects of the present technology, when the blade 102 extends straight out from the hub 104, the blade cannot be removed from the hub. In particular, in order to remove the blade from the hub, the pins 124 would need to follow the curved slots 120, along the path of arrow 132 in FIG. 9. In so doing, the blade would need to move inward, toward the center region 110 of hub 104, as indicated by dashed arrow 134.

However, when the blade 102 is straight out from hub 104, the edge 126 of blade 102 will abut against shoulder 114 as the blade moves inward along arrow 134 to prevent the pins 124 from following the slots 120. Thus, removal of the blade 102 would be prevented. Although FIGS. 8 and 9 show a single blade 102, the second blade would similarly be locked within the slots 120 on the opposed half of hub 104.

Figure 10:
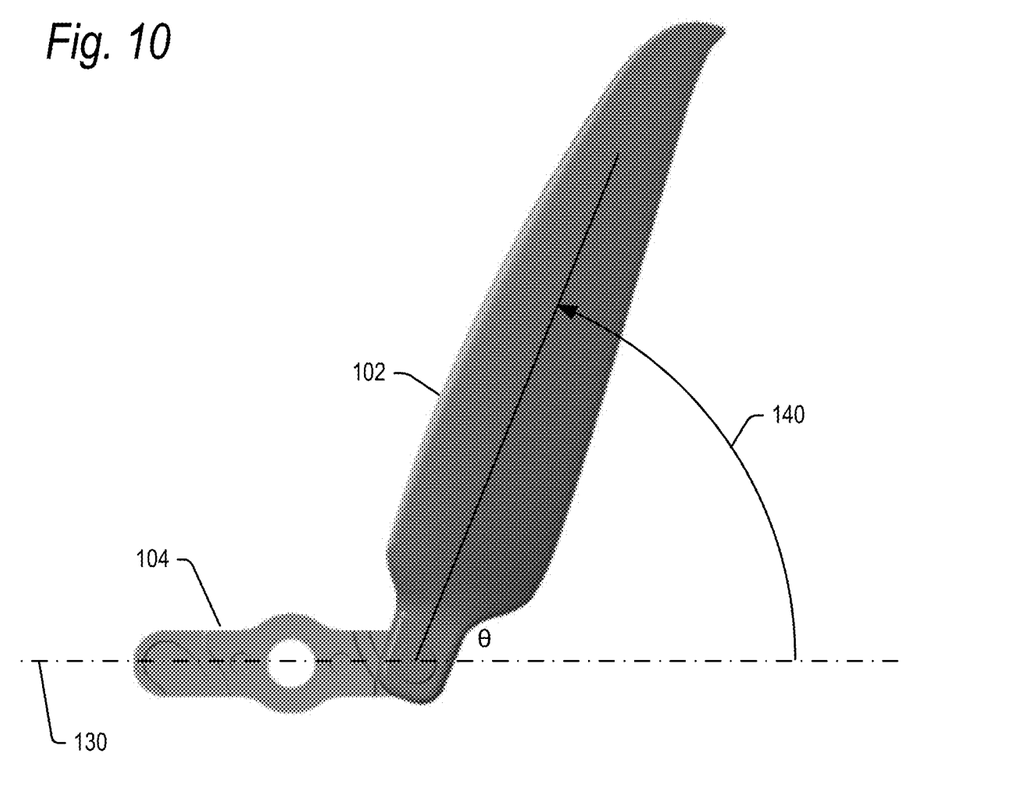
FIG. 10 is a top view of a blade affixed to a hub and extending at a predefined threshold angle with respect to the hub according to embodiments of the present technology.
Figure 11:
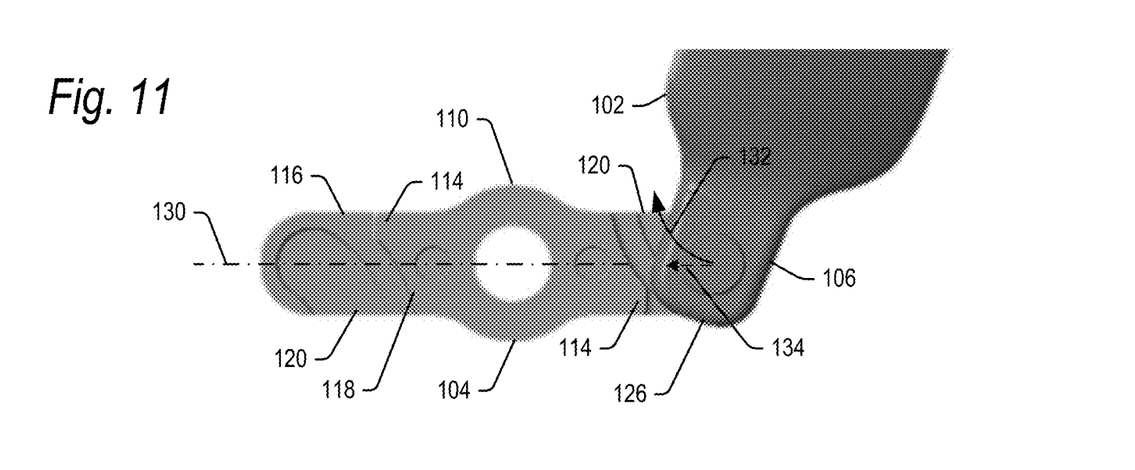
FIG. 11 is an enlarged top view of the hub and a portion of the blade shown in FIG. 10.

FIG. 10 is a view of the blade 102 affixed to the hub 104, and FIG. 11 is an enlarged view of the hub and a portion of the blade shown in FIG. 10 (again, one half 104a of the hub 104 is removed in FIGS. 10 and 11 for clarity). FIGS. 10 and 11 show the blade 102 rotated along arrow 140 to some forward threshold angle θ with respect to the hub 104. Where the propeller 100 is configured for right hand propeller rotation, this forward threshold angle θ would be a forward rotation of the blade 102 (counterclockwise from the perspective of FIGS. 10 and 11). This counterclockwise rotation of the blade 102 relative to the hub 104 while the propeller is also rotating in the counterclockwise direction would be opposed by the aerodynamic forces (drag) on the propeller blades.

In accordance with aspects of the present technology, when the blade 102 is rotated to the forward threshold angle, the blade can be removed from the hub. In particular, at the forward threshold angle, the edge 126 remains clear of the shoulders 114 as the pins 124 slide inward and along the curved slot 120. In examples, the forward threshold angle θ may be 60°. However, this angle may vary to be greater than or less than 60°, depending at least in part on the configuration of the shoulders 114, and shape of the connector end 106. Although FIGS. 10 and 11 show a single blade 102, the second blade would similarly be removed from within the slots 120 on the opposed half of hub 104 upon a similar rotation of the second blade to the forward threshold angle.

Figure 12:
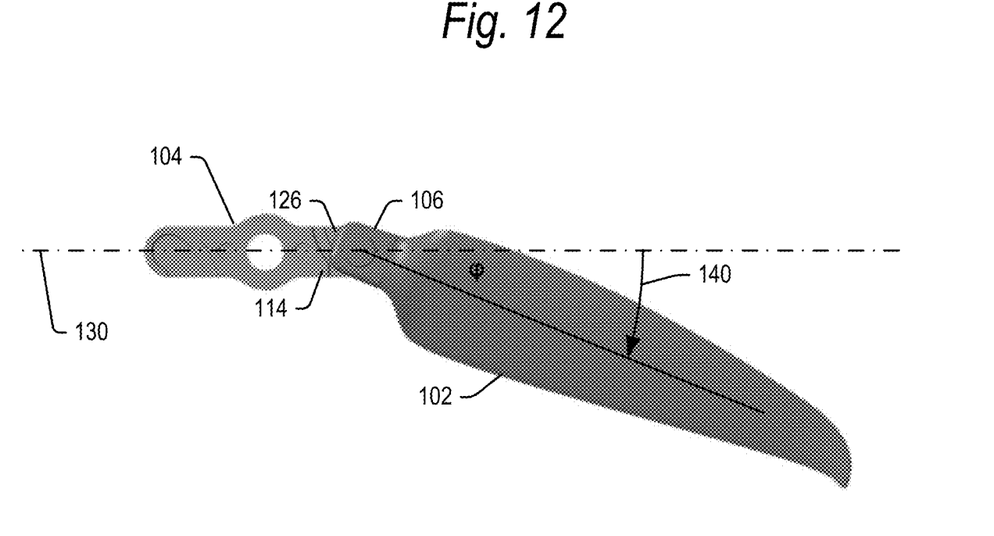
FIG. 12 is a top view of a blade affixed to a hub and extending at an alternative predefined threshold angle with respect to the hub according to embodiments of the present technology.

FIG. 12 show the blade 102 rotated along arrow 140 to some aft threshold angle φ with respect to the hub 104. Where the propeller 100 is configured for right hand propeller rotation, this aft threshold angle φ would be a reverse rotation of the blade 102 (clockwise from the perspective of FIGS. 10 and 11).

In accordance with further aspects of the present technology, when the blade 102 is rotated to the aft threshold angle, the blade can be removed from the hub. At the aft threshold angle, the edge 126 remains clear of the shoulders 114 as the pins 124 slide inward and along the curved slot 120. In examples, the aft threshold angle θ may be −25°. However, this angle may vary to be greater than or less than −25°, depending at least in part on the configuration of the shoulders 114, and shape of the connector end 106. Although FIG. 12 shows a single blade 102, the second blade would similarly be removed from within the slots 120 on the opposed half of hub 104 upon a similar rotation of the second blade to the aft threshold angle.

In accordance with aspects of the present technology, each blade 102 is removably affixed to the hub 104. Each blade 102 remains locked to the hub when the angle of the blade is not near the forward and aft threshold angles. As the blades would normally be biased by centrifugal force to extend straight out from the hub as explained above, it is not possible for the blades to unintentionally separate from the hub during propeller rotation. Additionally, centrifugal forces will bias the blades 102 to their fully seated position within the curved slots 120 (i.e., seated at the ends of the curved slots 120). This makes unintentional removal of the blades during rotation even further unlikely.

When a blade 102 is moved (for example manually when the hub 104 is stationary) to an angle near the forward or aft threshold angles, the blade 102 may then be easily removed from the hub 104. Specifically, once a blade 102 is provided at an angle near the forward or aft threshold angles, the blade may be easily slid out of the slots 120 and removed. No tools are complicated manual operations are required. Thus, if blades are damaged, they can be quickly and easily replaced. Alternatively, blade sizes (diameter and/or pitch) are easily changed to optimize the blades for different operating conditions.

As noted, when the blades 102 meet some predefined threshold angle relative to the hub 104, they may be removed from the hub. In embodiments, if the blades exceed or do not reach the threshold angle by too much or not enough, they may not be removed. Thus, there is a range of angles (for both forward and aft rotation) over which the blades 102 may be removed. If the blades are at an angle outside of these forward and aft rotational ranges of angles, the propeller remains affixed to the hub. In one example, the forward rotational range of angles over which the blades 102 may be removed is 60° to 35°. In one example, the aft rotational range of angles over which the blades 102 may be removed is −25° to −55°. It is understood that these ranges are provided by way of example only and may vary in further embodiments.

Figure 13:
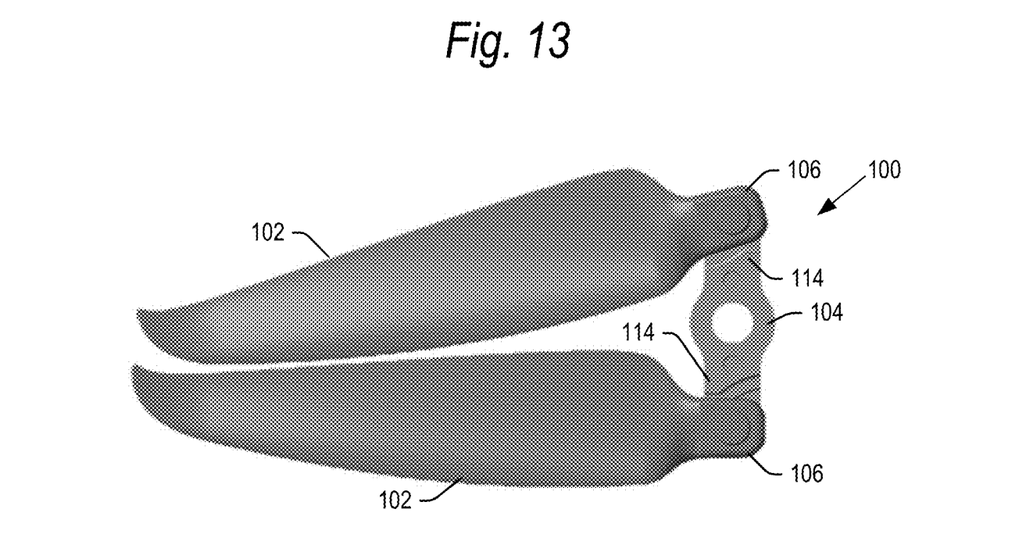
FIG. 13 is a top view of a pair of blades in storage positions on a hub according to embodiments of the present technology.

FIG. 13 shows a propeller 100 with the blades 102 rotated outside of the range of forward and aft angles for removal of the blades. Upon an attempt to remove a blade 102 from the positions shown in FIG. 13, an edge portion of the end connector 106 will abut against the shoulder 114, thereby preventing removal of the blade 102. The blades 102 may for example be placed in the positions shown in FIG. 13 for storage of the propeller 100. Alternatively, the blades 102 may be positioned at a removal angle, removed and stored separately.

In the above description, the blades 102 are positioned within a forward or aft rotational range of angles to allow sliding of the blades 102 out of the curved slots 120 and removal of the blades 102. When the blades 102 are separated from the hub 104, the blades may similarly be slid into the curved slots 120, and mounted on the hub 104, by positioning the blades within the forward or aft rotational range of angles, and seating the blades fully within the curved slots.

In embodiments, the forward threshold angle θ and the aft threshold angle φ may change as a blade 102 slides out of a slot 120. For example, in order to remove a blade 102 located at the base of a slot 120, the blade may be positioned at a forward threshold angle of about 60°. As the blade 102 begins to slide in the slot (for example one-half way out of the slot), the forward threshold angle of the blade may transition back to about 35°. The blade may exit the slot at about 35°. The same may be true for the aft threshold angle. The aft threshold angle may start at about −25° when a blade is at a base of the slot 120. As the blade slides out of the slot, the aft threshold angle may transition to about −55°. The blade may exit the slot at about −55°. The above threshold angles are provided by way of example only and may vary in further embodiments.

In summary, an example of the present technology relates to A propeller for a model aircraft, comprising: a hub configured to be rotationally mounted to the aircraft, the hub comprising a curved slot and a shoulder; a propeller blade comprising a pin configured to fit within the curved slot, the pin in the curved slot rotationally mounting the propeller blade to the hub, the propeller blade configured to be locked to the hub when the propeller blade is oriented at less than a predefined threshold angle with respect to an axis of the hub, and the propeller blade configured to be removable from the hub when the propeller blade is oriented at the predefined threshold angle with respect to the axis of the hub.

In another example, the present technology relates to propeller for a model aircraft, comprising: a hub configured to be rotationally mounted to the aircraft, the hub comprising a curved slot and a shoulder; a propeller blade comprising a pin configured to fit within the curved slot, the pin in the curved slot rotationally mounting the propeller blade to the hub, the curved slot configured so that the propeller blade moves inward toward an axis of rotation of the hub upon sliding the propeller blade out of the curved slot, a portion of the propeller blade abutting against the shoulder at some point during the inward movement of the propeller blade along the curved slot when an angle of the propeller blade relative to an axis of the hub is less than a predefined threshold angle.

In a further example, the present technology relates to a propeller for a model aircraft, comprising: hub means for rotationally mounting to the aircraft, the hub comprising slot means and shoulder means; propeller blade means comprising pin means for fitting within the slot means, the pin means in the slot means rotationally mounting the propeller blade means to the hub means, the propeller blade means locking the hub means when the propeller blade means is oriented at less than a predefined threshold angle with respect to an axis of the hub means, and the propeller blade means removable from the hub means when the propeller blade means is oriented above the predefined threshold angle with respect to the axis of the hub means.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A propeller for a model aircraft, comprising:
a hub configured to be rotationally mounted to the aircraft, the hub comprising a curved slot and a shoulder, the curved slot having an open end;
a propeller blade comprising a pin configured to fit within the curved slot, the pin in the curved slot rotationally mounting the propeller blade to the hub, the propeller blade configured to be locked to the hub by the shoulder preventing movement of the pin along the slot when the propeller blade is oriented at less than a predefined threshold angle with respect to an axis of the hub, and the propeller blade configured to be removable from the hub by allowing the pin to slide along the slot and out the open end when the propeller blade is oriented at the predefined threshold angle with respect to the axis of the hub.

2. The propeller of claim 1, wherein the threshold angle is a forward threshold angle where the propeller blade is rotated in the direction in which the propeller blade is configured to rotate.

3. The propeller of claim 2, wherein the forward threshold angle is 60 degrees.

4. The propeller of claim 2, further comprising an aft threshold angle where the propeller blade is rotated in the direction opposite to the direction in which the propeller blade is configured to rotate, the propeller blade configured to be locked to the hub when the propeller blade is oriented at less than the aft threshold angle with respect to the axis of the hub, and the propeller blade configured to be removable from the hub when the propeller blade is oriented at the aft threshold angle with respect to the axis of the hub.

5. The propeller of claim 4, wherein the aft threshold angle is −25 degrees.

6. The propeller of claim 1, wherein the curved slot is configured so that the propeller blade moves inward toward an axis of rotation of the hub upon sliding the propeller blade out of the curved slot.

7. The propeller of claim 6, wherein a portion of the propeller blade abuts against the shoulder at some point during the inward movement of the propeller blade along the curved slot when the angle of the propeller blade relative to the hub is less than the predefined threshold angle.

8. The propeller of claim 7, wherein the propeller blade does not touch the shoulder during the inward movement of the propeller blade along the curved slot when the angle of the propeller blade relative to the hub is greater than the predefined threshold angle.

9. The propeller of claim 1, wherein the curved slot comprises a first curved slot on a first side of the hub, the shoulder comprises a first shoulder on the first side of the hub, and the propeller blade comprises a first propeller blade, the propeller further comprising:
a second curved slot and a second shoulder on a second side of the hub opposite the first side;
a second propeller blade comprising a second pin configured to fit within the second curved slot, the second pin in the curved slot rotationally mounting the second propeller blade to the hub, the second propeller blade configured to be locked to the hub when the second propeller blade is oriented at less than the predefined threshold angle with respect to the axis of the hub, and the second propeller blade configured to be removable from the hub when the second propeller blade is oriented at the predefined threshold angle with respect to the axis of the hub.

10. The propeller of claim 1, wherein the propeller is configured for use on a model airplane.

11. The propeller of claim 1, wherein the propeller is configured for use on at least one of a model helicopter and model multi-copter.

12. A propeller for a model aircraft, comprising:
a hub configured to be rotationally mounted to the aircraft, the hub comprising a curved slot and a shoulder;
a propeller blade comprising a pin configured to fit within the curved slot, the pin in the curved slot rotationally mounting the propeller blade to the hub, the curved slot configured so that the propeller blade moves inward toward an axis of rotation of the hub upon sliding the propeller blade out of the curved slot, a portion of the propeller blade abutting against the shoulder at some point during the inward movement of the propeller blade along the curved slot when an angle of the propeller blade relative to an axis of the hub is less than a predefined threshold angle.

13. The propeller of claim 12, wherein the propeller blade does not touch the shoulder during the inward movement of the propeller blade along the curved slot when the angle of the propeller blade relative to the hub is greater than the predefined threshold angle.

14. The propeller of claim 12, wherein the threshold angle is a forward threshold angle where the propeller blade is rotated in the direction in which the propeller blade is configured to rotate.

15. The propeller of claim 14, wherein the forward threshold angle is 60 degrees.

16. The propeller of claim 14, further comprising an aft threshold angle where the propeller blade is rotated in the direction opposite to the direction in which the propeller blade is configured to rotate, the portion of the propeller blade abutting against the shoulder at some point during the inward movement of the propeller blade along the curved slot when an angle of the propeller blade relative to an axis of the hub is less than the aft threshold angle.

17. The propeller of claim 16, wherein the propeller blade does not touch the shoulder during the inward movement of the propeller blade along the curved slot when the angle of the propeller blade relative to the hub is greater than the aft threshold angle.

18. The propeller of claim 16, wherein the aft threshold angle is −25 degrees.

19. The propeller of claim 12, wherein the curved slot comprises a first curved slot on a first side of the hub, the shoulder comprises a first shoulder on the first side of the hub, and the propeller blade comprises a first propeller blade, the propeller further comprising:

a second curved slot and a second shoulder on a second side of the hub opposite the first side;

a second propeller blade comprising a pin configured to fit within the second curved slot, the pin in the second curved slot rotationally mounting the second propeller blade to the hub, the second curved slot configured so that the second propeller blade moves inward toward an axis of rotation of the hub upon sliding the second propeller blade out of the second curved slot, a portion of the second propeller blade abutting against the second shoulder at some point during the inward movement of the second propeller blade along the second curved slot when an angle of the second propeller blade relative to an axis of the hub is less than a predefined threshold angle.

20. A propeller for a model aircraft, comprising:

a hub configured to be rotationally mounted to the aircraft, the hub comprising a curved slot and a shoulder; and a propeller blade comprising a pin configured to fit within the curved slot, the pin in the curved slot rotationally mounting the propeller blade to the hub, the propeller blade configured to be locked to the hub when the propeller blade is oriented at less than a predefined threshold angle with respect to an axis of the hub, and the propeller blade configured to be removable from the hub when the propeller blade is oriented at the predefined threshold angle with respect to the axis of the hub;

wherein the curved slot is configured so that the propeller blade moves inward toward an axis of rotation of the hub upon sliding the propeller blade out of the curved slot.

21. The propeller of claim 20, wherein the threshold angle is a forward threshold angle where the propeller blade is rotated in the direction in which the propeller blade is configured to rotate.

22. The propeller of claim 21, wherein the forward threshold angle is 60 degrees.

23. The propeller of claim 21, further comprising an aft threshold angle where the propeller blade is rotated in the direction opposite to the direction in which the propeller blade is configured to rotate, the propeller blade configured to be locked to the hub when the propeller blade is oriented at less than the aft threshold angle with respect to the axis of the hub, and the propeller blade configured to be removable from the hub when the propeller blade is oriented at the aft threshold angle with respect to the axis of the hub.

24. The propeller of claim 23, wherein the aft threshold angle is −25 degrees.

25. The propeller of claim 20, wherein a portion of the propeller blade abuts against the shoulder at some point during the inward movement of the propeller blade along the curved slot when the angle of the propeller blade relative to the hub is less than the predefined threshold angle.

26. The propeller of claim 20, wherein the propeller blade does not touch the shoulder during the inward movement of the propeller blade along the curved slot when the angle of the propeller blade relative to the hub is greater than the predefined threshold angle.

* * * * *